United States Patent [19]

Smirnov et al.

[11] 4,112,702
[45] Sep. 12, 1978

[54] FREEZE DESALINATION AND CONCENTRATION APPARATUS

[76] Inventors: Leonard Fedorovich Smirnov, ulitsa Segedskaya, 3, kv. 37; Vladimir Mikhailovich Parkhitko, ulitsa Baranova, 28, kv. 5, both of Odessa; Valentin Ivanovich Zverkhovsky, ulitsa 28 ijunya, 1, Moldavskaya SSR, Chimishliisky raion, poselok Bessarabka; Oleg Antonovich Burtov, ulitsa Kirova, 25; Nikolai Ivanovich Razuvaev, ulitsa Sadovaya, 27, kv. 9, both of Yalta Krymskoi oblasti; Fedor Evdokimovich Dovzhko, ulitsa Sinelnikova, 2, kv. 92, Khabarovsk; Moisha Gershovich Kleiman, pereulok Grazhdansky, 11, kv. 12, Khabarovsk; Valentin Ivanovich Dzyan, ulitsa Panfilovtsev, 43, kv. 63, Khabarovsk, all of U.S.S.R.

[21] Appl. No.: 756,131

[22] Filed: Jan. 3, 1977

[30] Foreign Application Priority Data

Feb. 23, 1976 [SU] U.S.S.R. ................ 2320651
Feb. 23, 1976 [SU] U.S.S.R. ................ 2320652
Feb. 23, 1976 [SU] U.S.S.R. ................ 2320653

[51] Int. Cl.² .................... B01D 9/04; C02B 1/12
[52] U.S. Cl. ........................ 62/123; 62/343; 62/354; 62/544; 165/86; 165/94
[58] Field of Search ............... 62/123, 342, 343, 354, 62/544; 165/86, 94

[56] References Cited

U.S. PATENT DOCUMENTS

| | | | |
|---|---|---|---|
| 3,103,792 | 9/1963 | Davids | 62/123 |
| 3,136,707 | 6/1964 | Hickman | 62/123 |
| 3,251,193 | 5/1966 | Wiegandt | 62/123 |
| 3,342,039 | 9/1967 | Bridge et al. | 62/123 |
| 3,357,196 | 12/1967 | Dutcher et al. | 62/123 |
| 3,614,874 | 10/1971 | Martindale et al. | 62/123 |

Primary Examiner—Ronald C. Capossela
Attorney, Agent, or Firm—Steinberg & Blake

[57] ABSTRACT

A freeze desalination and concentration apparatus comprising a desalination unit including mounted in the flow sequence a three-circuit heat exchanger, a condenser for a refrigerant and for melting ice mass, a cylindrical crystallizer having a separator with an auger arrangement mounted inside the crystallizer in a spaced relationship thereto and coaxially therewith. An ice-cutting device is accommodated between the crystallizer and separator, and another ice-cutting device is provided between the casing of the desalination unit and the outer ice-forming surface of the crystallizer, the lower part of the crystallizer having a perforated bottom plate, and the apparatus further comprises, directly adjacent to the desalination unit a refrigerator compressor, pumps, a pipeline for feeding a mixture of a starting solution and a part of recycled brine, the refrigerant condenser and the three-circuit heat exchanger being combined to form an integral heat-exchange system.

9 Claims, 2 Drawing Figures

FREEZE DESALINATION AND CONCENTRATION APPARATUS

The invention relates to freeze desalination and concentration systems, and more specifically to a freeze desalination and concentration apparatus.

The freeze desalination and concentration apparatus may be used for desalination of sea and saline water, for producing high-grade potable distilled water with an output of up to 24 cu.m of distilled water per day on sea going vessels and other vehicles, as well as for water supply systems of small settlements in remote places where distilled water is not available.

The freeze desalination and concentration apparatus may be used also in food industry for concentration of various liquid food products (juices, wine, beer, milk, soluble coffee). The purposes of concentration and fields of application of the freeze desalination and concentration apparatus are given in Table 1.

Table 1

| No. | Purpose of concentration | Application |
|---|---|---|
| 1 | Production of distilled water from saline water or from sea water for drinking or other purposes | Desalination |
| 2 | Reduction of volume of liquid to be stored or processed at a factory | Beer concentration |
| 3 | Lowering the cost of transport and containers | Concentration of orange juice |
| 4 | Increase in the concentration of substances whose content is small for correct analysis or reaction | Laboratory equipment for oceanographic scientific researches |
| 5 | Increase in the content of sugar in food liquids to a level providing for deceleration or complete elimination of processes of microbiological deterioration | Fruit sirups, food liquids stock in the State food fund system |
| 6 | To make a more concentrated liquid which can then be subsequently completely and effectively dehydrated by sublimation at temperatures below eutectic | Manufacture of soluble coffee |
| 7 | Reestablishing the initial concentration of liquids diluted during preliminary processing | Concentration of beverages and broths |
| 8 | Production of new food products | Malt made of concentrated beer |
| 9 | Increase in the concentration of components in liquids up to a desired level | Concentration of wines to increase alcohol content |
| 10 | Acceleration of processing rate by premature precipitation of dissolved or suspended substances | Concentration of beer for reducing the production time |
| 11 | Increase in the concentration of dissolved substances up to the level sufficient for their effective removal | Concentration for decontamination of waste water |
| 12 | Processing of products to prevent deterioration of quality during transportation | Stabilization of wines for exports |

In come specific cases a freeze concentration and desalination apparatus is the most advantageous facility. Thus, in the concentration of beer, the concentration apparatus enables:

improvement of beer stability, prolongation of the storage term;
reduced number of processing vessels and storage containers due to a smaller volume and accelerated processing;
reduced capacity of refrigirating equipment;
reduced transport costs;
operation of brewery under full load almost all year round;
possibility of operating sattelite factories serviced by a single large brewery.

The freeze desalination and concentration apparatus may be used for purification of small volumes of industrial waste water (up to 24 cu.m per day) with any composition of contaminants (especially those toxic or insufficiently cleaned from mud and suspensions for which evaporation and membrane techniques cannot be used).

A compact, mobile and multi-purpose freeze desalination and concentration apparatus operating on the continuous basis exhibiting high economical advantages, which is reliable and suitable for removal of water from any kind of aqueous solutions is to be provided. Depending on what is the product — distilled water or a concentrate — this apparatus may be used either for desalination of saline or sea water or for concentration of various solutions, first of all, food liquids.

As differred from separation of aqueous solutions by evaporation which is now widely used in industry, the freeze technique has obvious advantages in both applications. With the use of the freeze desalination technique no scum is formed, corrosion of material at low temperatures is reduced and power consumption is lower. Distilled "snow" water is much better than water obtained by the desalination technique as regards quality and organoleptic characteristics.

As differed from concentration of food liquids by evaporation, with the use of the freeze concentration technique there are no losses of aromatic components, gustatory qualities are not hampered and vitamins are not destroyed under the action of elevated temperatures and due to impaired alimentary value. Improvement of product quality is especially required in the manufacture of wines, coffee (for preserving wine bouquet or flavour of soluble coffee).

Desalination or concentration of solutions by freezing comprises three basic steps:
formation of ice from solution;
separation and washing of ice from brine;
ice melting.

The first two steps are the most difficult ones. The formation of ice should be effected using an equipment having short residence time of the solution in a crystallizer and small size. Separation and washing of ice from brine should be carried out for obtaining potable water (containing less than 0.05% of salts) or with small losses of dry substances (such losses should not exceed 0.1% in the concentration mode). These requirements are contradictory. Generally large-sized ice crystals are preferable to improve separation and washing of ice from brine. However, this results in too slow ice formation and in associated with large capital investments in crystallizer. The solution of this problem is especially complicated when food liquids are to be processed. Initial concentration of dry substances in food liquids in sufficiently high (up to 15%) and the relative data are given in Table 2.

Table 2

Average Concentration of Dry Substances in Food Liquids

| Food liquid | Concentration of dry substances (%) |
|---|---|
| Apple juice | 13.5 |
| Beer | 4.5 |
| Coffee | from 1.2 to 1.6 |
| Cranberry juice | 10.6 |
| Orange juice | 12.7 |
| Tea | 0.35 |

Table 2-continued

Average Concentration of Dry Substances in Food Liquids

| Food liquid | Concentration of dry substances (%) |
| --- | --- |
| Wine (dry) | 2 |
| Wine (sweet) | from 8 to 10 |
| Strawberry juice | 8.0 |
| Grape juice | 14.3 |

Maximum degree of concentration of dissolved substances depends on the eutectic concentration and is about 50% for the majority of liquids. Thus, orange juice concentrate contains 42% of dry substances, and coffee extract is concentrated at up to 35–50% prior to subsequent drying. Food liquids to be concentrated have variable characteristics depending on the season, and the concentration apparatus should be adaptable to variable operating conditions during the whole year.

Therefore, the problem is to provide a multi-purpose, compact and highly efficient freeze desalination and concentration apparatus operating on a continuous basis which enables the production of high-grade products (fresh water or food concentrate) with low concentration of removed distilled systems which are now widely used in a number of applications.

Known in the art are many types of desalination and concentration apparatus using the freeze technique, and they differ from one another mainly in the design of crystallizer and separator. The most suitable apparatus of the type for processing food liquids are those in which contactless heat removal method is used, that is in which ice is frozen-out from food liquids by using a heat conductive surface so that food liquid concentrate cannot be contaminated due to its contact with a coolant.

Thus, known in the art are freeze concentration apparatus manufactured by French companies Establissement Daubron de Paris and La Societe du Filtre Gasquet Bordeaux which are designed for increasing the content of alcohol in wines and have a capacity of 12 and 24 cu.m of removed water per day. These concentration apparatus comprise a vertical or horizontal crystallizer provided with ice cutting scrapers and coupled to a single-stage ammonia refrigeration compressor. Ice mass is separated from the wine concentrate by means of an intermittent-action filter press having a hydraulic drive or in a centrifugal with a perforated casing.

Starting solution is fed to a crystallizer, and ice is formed on the inner surface thereof to be cut off by scrapers. Then the ice mass is separated from concentrate and charged into a separator at regular intervals to obtain concentrate at the outlet thereof, distilled water being removed from the separator.

Known desalination and concentration apparatus have a large size and require much metal for construction. They feature high power requirements and considerable losses of dry substances with the removed distilled water.

Known in the art is a freeze concentration apparatus operating on the continuous basis which is designed for concentration of beer and coffee extract.

The concentration apparatus has a single-stage refrigeration compressor, a crystallizer and a cooler for cooling down and freezing the solution, and a separator comprising a vertical impulse-type washing tower. Suspension of ice and concentrate is fed to the top part of the tower. An outlet for the concentrate is provided in the top part of the tower. The bottom part of the tower accommodates a heat exchanger for melting ice mass and has an outlet for distilled water connected to the delivery pipe of the impulse device (pump). Starting solution is cooled down in the crystallizer and partially frozen. Ice and concentrate suspension is pumped to the top part of the washing tower. The concentrate is removed immediately in this part of the tower, and the ice mass descending towards the heat exchange is melted in the bottom part of the tower. The ice mass moving downwardly to the heat exchanger is intermittently penetrated by the front of the distilled washing water which flows is the counter-current due to the provision of the impulse generating device. The impulses in the completely full washing tower provide for filtering, movement of the ice mass and moving force for the distilled washing water. The process is repeated in two and even three stages if required. It is known that the washing tower of the above-described type permits the losses of dry substances with removed water to be reduced to 0.01%.

Inspite of the above-mentioned advantage, the equipment forming the concentration apparatus of the type described is not compact, and the apparatus requires much metal for its construction and is very costly. In addition, this apparatus is characterized by high power requirements, is complicated as regards the control of operating conditions of crystallization and separation of ice mass from concentrate.

Known in the art is a freeze concentration apparatus operating on the continuous basis which is designed for concentration of viscous food liquids (fruit juices and the like). The concentration apparatus consists of two plate heat exchangers for cooling down starting solutions, pumps, a single-stage refrigeration compressor connected, via refrigerant conduits, to two series connected first- and second-stage crystallizers and to a shell-and-tube condenser. The crystallizers are of the horizontal multitube non-scraping type. Temperature head, turbulence and crystal concentration of the suspension in the crystallizers are thoroughly controlled so as to obtain regular crystals which can be then easily washed from concentrate. Each crystallizer has its own separator for separation of ice mass from concentrate, the separator comprising a continuous contrifuge with latticed screens. There is also provided a plate-type ice mass melting device connected to a warm water source.

Starting solution is precooled in heat exchangers and is then fed to the first-stage crystallizer in which ice suspension is formed.

The suspension is fed to the first-stage centrifugal in which concentrate is separated from the ice. Then the concentrate is pumped to the second-stage crystallizer wherefrom the ice mass is fed to the second-stage centrifuge, and the concentrate having a desired concentration is obtained at the outlet of the second-stage centrifuge. Ice crystals dehydrated in the centrifuges are washed with distilled water and partially fed to the centrifuges for washing purposes and partially removed from the apparatus after having precooled the starting solution in the heat exchangers.

The disadvantages of the above-described concentration apparatus reside in multiple branching of the system which makes the apparatus combersome and results in large capital investments.

Known in the art is a freeze distillation apparatus comprising a desalination unit, a refrigiration compressor, a pump and connecting pipelines. The vertical desalination unit of the apparatus of this type comprises two outer tubes and one inner tube coaxially mounted in one another having their ends closed by a cover plate and a bottom wall. The lower part, between the tubes, accommodates a three-circuit heat exchanger for cooling down starting solution and a crystallizer both formed by ribbed and flat-walled cylinders. Heat insulation is arranged between the outer surface of the crystallizer and the heat exchanger. The inner surface of the inner tube is the ice forming surface. The lower of the inner tube comprises the crystallizer, and the upper part of the inner tube defines a separator for separating ice mass from brine. The inner tube accommodates a hollow shaft provided with an auger and a scraper which are separated from each other by means of a filtering screen. The upper part of the inner tube is provided with a condenser for condensing refrigerant and for melting ice which is arranged coaxially with the tube and is externally provided with ribs. Feeding of starting and recycled brine to the crystallizer is effected through a pipe mounted in the bottom wall, and the brine is drained through the filtering screen. Starting solution is cooled down in the three-circuit heat exchanger, mixed with the recycled brine and fed to the lower part of the crystallizer. When the refrigerant is present in the slit-shaped space of the crystallizer, ice is formed on the inner surface of the inner tube, scraped off by the auger and is fed there by in the form of ice mass to the separator in which the ice mass is washed off brine with the countercurrent flow of the washing water fed to the separator along the hollow shaft. In the upper part of the separator, the ice mass is fed by the scraper to the ice melting chamber of the refrigerant condenser and is melted therein to provide for condensation of the refrigerant in the adjacent outer chamber. Then the distilled water is removed from the apparatus, via the three-circuit heat exchanger, as finished product.

In the above-described freeze desalination apparatus the outer surface of the crystallizer is not used for ice formation which considerably reduces the throughput capacity of the apparatus and results in increased cost. The apparatus of the above-described type is inefficient as regards power requirements because of the use of a single-stage refrigeration cycle. In addition, quality of distilled water obtained in this apparatus is rather inadequate so that such apparatus cannot be used for processing various high-concentrated food liquids.

It is an object of the invention to provide a freeze desalination and concentration apparatus having high efficiency as regards power requirements, which is compact, small in size, does not require much metal for construction and enables the production of high-grade distilled water or concentrates of food liquids with small losses of dry substances.

This object is accomplished in that in a freeze desalination and concentration apparatus comprising a desalination unit including a vertical cylindrical casing having the top part closed by a cover plate and the bottom part closed by a bottom wall, the casing accommodating a centrally located separator for separation and washing of ice mass from brine having an auger device with a shaft provided, at the upper end thereof, with a scraper for throwing about ice mass, as well as mounted coaxially with the shaft of the auger device a cylindrical crystallizer for ice mass, a three-circuit heat exchanger for cooling down a starting solution, a condenser for refrigerant and for melting ice mass arranged at the top part of the desalination unit coaxially with the separator, the apparatus also comprising, directly adjacent to the desalination unit, a refrigeration compressor, pumps, a line for feeding a mixture of the starting solution and recycled concentrated brine, according to the invention, the separator being arranged inside the crystallizer in a spaced relationship thereto; the space between the separator and crystallizer accommodating an ice-cutting device for cutting ice off the inner surface of the crystallizer, and there is provided another ice-cutting device which is arranged between the casing of the desalination unit and the outer ice-forming surface of the crystallizer, the lower part of the crystallizer having a perforated plate, for collecting the ice mass, which is rigidly secured to the crystallizer, the lower turn of the auger device terminating in a vane formed as half-spiral for picking-up and feeding the ice mass from the plate to the separator, the radius of the vane corresponding to the radius of the plate. The condenser for refrigerant and for melting the ice mass and the three-circuit heat exchanger are combined to form a single heat-exchange system, and the line for feeding a mixture of the starting solution and recycled concentrated brine is divided into a line for feeding a mixture of the starting solution and a part of recycled brine to the inner ice-forming surface of the crystallizer and a line for feeding the remaining recycled brine to the outer ice-forming surface of the crystallizer.

The heat-exchange system of the freeze desalination and concentration apparatus is preferably arranged above the crystallizer and outside the top part of the separator, the heat exchanger for cooling down the starting solution being arranged outside the condenser for refrigerant and for melting the ice mass, and an additional refrigerant condenser being arranged on the outer surface of the heat exchanger coaxially therewith, the additional condenser being connected by means of pipelines to an additional refrigeration compressor.

The line for feeding a mixture of the starting solution and a part of recycled brine in the freeze desalination and concentration apparatus is preferably connected to a toroidal manifold which is arranged coaxially with and on the outer surface of the separator opposite to the top part of the crystallizer, the manifold having devices for feeding a mixture of the starting solution and a part of recycled brine equally spaced along the perimeter of the toroidal manifold, and the line for feeding the remaining recycled brine is preferably connected to the lower part of the shaft of the auger device, the shaft being made hollow and connected, directly below the plate, to a tubular manifold having spraying nozzles arranged between the wall of the casing of the desalination unit and the outer surface of the crystallizer.

The freeze desalination and concentration apparatus preferably comprises a gas pressure device disposed directly adjacent to the desalination unit which is designed for feeding compressed gas to the separator through a passage in the cover plate of the desalination unit.

The freeze desalination and concentration apparatus according to the invention is a multi-purpose apparatus, it is compact, small in size, does not require much metal for its construction, has a low power comsumption, is convenient in operation and achieves an improved quality of distilled water.

The freeze desalination and concentration apparatus has the following characteristics:
throughout capacity from 0.1 to 24 cu.m of removed water per day;

concentration of starting solution (of salts or dry substances in a food liquid) from 0.2 to 20%;

concentration of brine or food liquid concentrate only depends on and is limited by the eutectic concentration of a solution to be separated;

salt content of distilled water (or losses of dry substances in the removed water) no more than 0.05%.

With the throughput capacity 12 cu.m of removed water per day:

dimensions of the desalination and concentration apparatus are: diameter 1.4 m, height 2.8 m;

area occupied by the distillation and concentration apparatus is 3×1.5 m;

mass of the distillation and concentration apparatus is about 2.5 tons;

specific electric energy consumption is 26 kW-h per 1 cu.m of removed water;

refrigerating capacity of compressors is 57000 kcal per hour.

The invention will now be described with reference to a specific embodiment thereof illustrated in the accompanying drawings, in which.

The freeze desalination and concentration apparatus comprises a desalinating unit 1 (FIG. 1) including a cylindrical casing 2, a flange 3, a bearing pipe 4, an upper cover plate 5 and a bottom wall 6. The desalination unit 1 accommodates a centrally located separator 7 having an auger device including a shaft 8 and an auger 9. The upper end of the shaft 8 is provided with a scraper 10. The shaft 8 is journalled in the cover plate 5 and in the bottom wall 6 in support bearings 11 by means of packings 12. Arrows 13 indicate the flow of ice mass in the separator 7. Arrows 14 indicate countercurrent flow of washing water in the separator 7. The upper part of the separator 7 is provided with guides 15 causing rotation of the ice mass. The lower turn of the auger 9 terminates in a vane 16 which is formed as half-spiral having a radius corresponding to the radius of a perforated bottom plate 17 for collecting the ice mass.

Figure 1:
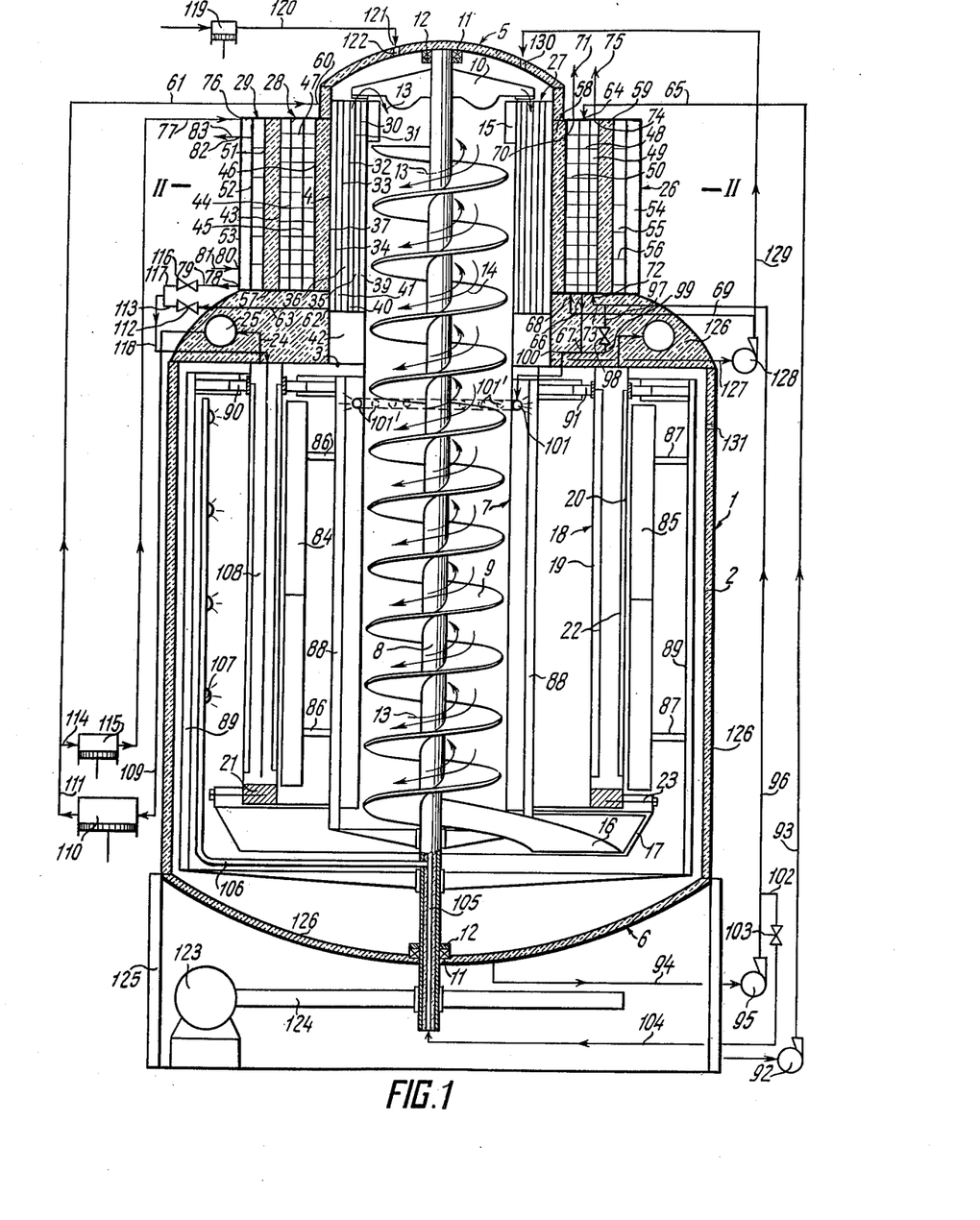
FIG. 1 shows a general view of the freeze desalination and concentration apparatus.

The desalination unit 1 also comprises a cylindrical crystallizer 18 for ice mass which is arranged coaxially with the shaft 8 of the auger device and is composed of tubes 19 and 20 each having an upper end welded to the flange 3, the lower ends of the tubes being closed by a flange 21. The tubes 19, 20 are internally provided with welded vertical ribs 22 for improving the heat exchange.

The perforated bottom plate 17 is rigidly secured to the lower end of the crystallizer 18 by means of bolts 23.

The top part of the crystallizer 18 is connected, via a pipeline 24, to a separator 25.

The desalination unit 1 also comprises a heat-exchange system 26 including a cylindrical condenser 27 for refrigerant and for melting ice mass, a three-circuit heat exchanger 28 for cooling the starting solution and an additional condenser 29 for refrigerant.

The condenser 27 is rigidly secured to the bearing pipe 4 and is arranged in an annular space between the pipe 4 and the separator 7.

Figure 2:
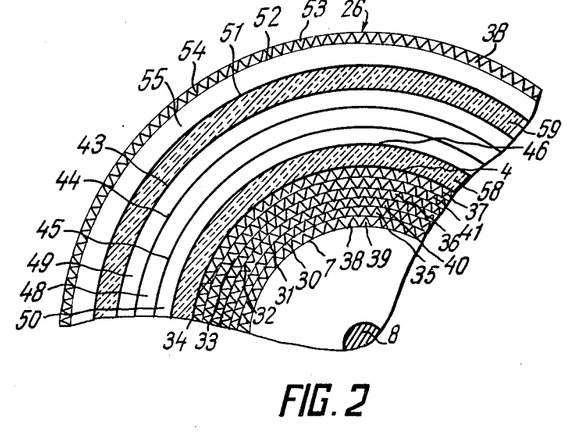
FIG. 2 is a sectional view of the heat-exchange system taken along the line II—II in FIG. 1.

The condenser 27 comprises a plate-and-rib heat exchanger consisting of a number of concentric tubes 30, 31, 32, 33, 34 and the separator 7 defining slits 35, 36, 37 having vertical undulated ribs 38 (FIG. 2) for the flow of condensing refrigerant through the slits. The slits 35, 36, 37 alternate with slits 39, 40, 41 having similar vertical undulated ribs. The slits 39, 40, 41 are designed for the descending flow of the aqueous suspension of ice in parallel with the vertical axis. Condensation heat of refrigerant is transmitted for melting ice in the aqueous suspension of ice circulating in the adjacent slits 39, 40, 41.

A collector 42 for distilled water is located under the condenser 27 (FIG. 1).

A three-circuit heat-exchanger 28 for cooling down the starting solution is arranged coaxially with the shaft 8 and outside the condenser 27.

The heat exchanger 28 is a three-slit plate-and-spiral heat exchanger. It consists of tubes 43, 44, 45 and 46 which are internally provided with horizontal spiral ribs 47. A slit 48 between the tubes 44 and 45 is designed for the flow of the starting solution being cooled. Slits 49 and 50 are designed for the flow of brine and distilled water, respectively.

An additional condenser 29 is used for maintaining thermal balance of the refrigeration system, and more specifically it is provided for condensing an excess of vapourous refrigerant.

The condenser 29 is a plate-and-rib spiral heat exchanger composed of tubes 51, 52 and 53 mounted in one another coaxially with the shaft 8.

An annular slit-shaped space 54 between the tubes 52 and 53 having vertical undulated ribs 38 (FIG. 2) is provided for circulation of condensed refrigerant. An annular slit-shaped space 55 (FIG. 1) defined between the tubes 51 and 52 having horizontal spiral ribs 56 is provided for circulation of cooling water.

The three-circuit heat exchanger 28 and the additional condenser 29 are secured to a flange 57 by means of a bolt joint (not shown).

Insulation layers 58 and 59 are arranged between the condenser 27, heat exchanger 28 and additional condenser 29.

The condenser 27 has an inlet 60 for vaporous refrigerant connected to a pipeline 61 and an outlet 62 for liquid refrigerant connected to a pipeline 63. The inlet 60 and the outlet 62 of the condenser 27 are connected to a manifold (not shown) which is provided for guiding vaporous refrigerant and discharging liquid refrigerant from respective slits 35, 36, 37 of the condenser 27.

The heat exchanger 28 has an inlet 64 for the starting solution connected to a pipeline 65 and an outlet 66 connected to a pipeline 67. An inlet 68 of the heat exchanger 28 connected to a pipeline 69 is designed for feeding distilled water which is removed from the heat exchanger 28 through an outlet 70 in the direction indicated by an arrow 71. The heat exchanger 28 also has an inlet 72 for feeding brine which is connected to a pipeline 73 and an outlet 74 for removing brine as indicated by an arrow 75.

The condenser 29 has an inlet 76 for feeding vaporous refrigerant which is connected to a pipeline 77 and an outlet 78 for liquid refrigerant which is connected to the pipeline 79. The condenser 29 also has an inlet 80 for cooling water which flows as indicated by an arrow 81 and an outlet 82 for the same water fed as indicated by an arrow 83.

The separator 7 is arranged inside the crystallizer in spaced relationship thereto the space between the separator 7 and the crystallizer 18 accommodating an ice-cutting device 84 for cutting-ice off the inner surface of the crystallizer 18 which comprises the tube 19. Another ice-cutting device 85 is provided between the casing 2 of the desalination unit 1 and the outer ice-forming surface of the crystallizer 18 which comprises the tube 20.

The devices 84 and 85 are connected by means of rods 86, 87 to cranked brackets 88 and 89 rigidly secured to the shaft 8.

At the top portions of the cranked brackets 88 and 89 there are provided roller bearings 90 and 91 fixed to shells (not shown), the bearings rolling over the outer and inner cylindrical surfaces of the crystallizer 18.

The freeze desalination and concentration apparatus has a line for feeding a mixture of the starting solution and a part of recycled brine which comprises a pump 92 for feeding the starting solution, a pipeline 93, the heat exchanger 28, the pipeline 67, a pipeline 94, a pump 95 for recycled brine, pipelines 96 and 97, a control valve 98, a pipeline 99, a pipeline 100 and a toroidal manifold 101 arranged coaxially with and on the outer surface of the separator 7 opposite to the top part of the crystallizer 18, the manifold having devices 101' for feeding a mixture of the starting solution and a part of recycled brine equally spaced along the perimeter of the toroidal manifold 101.

The freeze desalination and concentration apparatus also has a line for feeding the remaining recycled brine to the outer ice-forming surface of the crystallizer 18 including the pipeline 94, the pump 95, pipelines 96 and 102, a valve 103, a pipeline 104, the inner space 105 of the shaft 8, a tubular manifold 106 having spraying nozzles 107.

The freeze desalination and concentration apparatus has a refrigeration system including the crystallizer 18 whose inner space 108 functions as evaporator, the pipeline 24, the toroidal separator 25, a pipeline 109, a main refrigeration compressor 110, pipelines 111, 61, the condenser 27, the pipeline 63, a control valve 112, a pipeline 113, a pipeline 114, an additional refrigeration compressor 115, the pipeline 77, the additional condenser 29, the pipeline 79, a control valve 116, pipelines 117, 118. Liquid refrigerant is fed to the inner space 108 of the crystallizer 18 along the pipeline 118 having one end lowered to the bottom portion of the crystallizer 18. Thus it will be seen that a closed circuit is provided for the refrigerant which flows out of and is returned to the space 108.

The freeze desalination and concentration apparatus has a gas pressure device 119 which is disposed directly adjacent to the desalination unit 1 and is designed for feeding a compressed gas to the separator 7, via a pipeline 120, an inlet 121 of the unit 1 and a passage 122 in the cover plate 5 of the desalination unit 1.

The freeze desalination und concentration apparatus is provided with an electric motor 123 connected to the shaft 8 by means of a reducing gear 124.

The desalination unit 1 of the freeze desalination and concentration apparatus is provided with legs 125 welded to the casing 2 of the desalination unit 1. The casing 2 of the desalination unit 1, the bottom wall 6, the cover plate 5 and the space between the flanges 57 and 3 are coated with a heat insulation 126.

The freeze desalination and concentration apparatus is also provided with a distilled water circulation line comprising a pipeline 127 which communicates with chamber 42, a pump 128, a pipeline 129 connected to the cover plate 5 through a passage 130. The casing 2 of the desalination unit 1 is provided with a passage 131 for gas release. Also, it will be noted that the pipeline 69 branches from the pipeline 129 so as to deliver part of the distilled water to the inner space 50 of the heat-exchanger 28, the distilled water flowing out of this space 50 as indicated by the arrow 71 in FIG. 1.

The freeze desalination and concentration apparatus functions in the following manner.

A starting solution (which may be a starting food liquid) is fed by the pump 92 along the pipeline 93 to the inlet 64 of the three-circuit heat exchanger 28 in which the solution is cooled at about +2° C. due to the heat exchange with cool brine and distilled water. Then the solution leaving the heat exchanger 28 is mixed with a part of the recycled brine of a higher concentration which is fed by the pump 95 along the pipelines 96, 97, the valve 98 and the pipeline 99, this brine being derived through the bottom wall 6 of the desalination unit 1. After the concentration has been increased, the mixture of the starting solution and recycled brine is fed along the pipeline 100 to the toroidal manifold 101 wherefrom it flows down in the form of a thin film through the devices 101' over the inner ice-forming surface of the crystallizer 18.

The remaining recycled brine is fed, via the pipeline 102, valve 103, pipeline 104, the inner space of the shaft 8, tubular bent manifold 106, to be sprayed through the nozzles 107 onto the outer ice-forming surface of the crystallizer 18.

A refrigerant, such as Freon-12 boils within the inner space 108 of the crystallizer 18 at about −10° C. thus taking off the heat of ice formation through the walls of the tubes 19 and 20.

The ice formed on the inner and outer ice-forming surfaces of the crystallizer is scaled off by the ice-cutting devices 84 and 85 and falls under gravity onto the perforated bottom plate 17 wherefrom it is picked up by the vane 16 to be fed to the separator 7 in the form of a porous ice mass. The ice mass moving upwardly under the action of the auger 9 is washed with a flow of distilled water (delivered from pipeline 129) which descends in countercurrent with the upwardly moving ice mass. The distilled water expells the brine which is present in the intercrystalline voids thereby washing the crystals off brine. Furthermore, the ascending ice mass is penetrated with a gas (such as air or carbon dioxide) which is fed to the separator 7 by means of the gas pressure device 119 through the pipeline 120 and passage 122 in the cover plate 5. The gas washes the ice mass off the brine flowing down through voids which are free from ice to the bottom plate 17 and therefrom, through the perforations of the bottom plate 17, to the bottom wall 6. Waste gas is discharged through the passage 131.

The ice mass washed from brine flows directly along the guides 15 within the separator 7 to be entrained by the rotary scraper 10 and thrown about over the top part of the condenser 27. The desalinated ice mass is liquefied to a concentration of about 15% of the ice content in the space below the cover plate 5 with the addition of the recycled distilled water which is fed there from the collector 42, via the pipeline 127, by means of the pump 128 through the pipeline 129 and the passage 130 in the cover plate 5. Then the aqueous suspension of ice is pumped through the slits 39, 40 and 41 of the plate-and-rib condenser 27 so that ice melts at about 0° C. to take-off condensation heat of the refrigerant which is condensed at 8° C. in the slits 35, 36 and 37 of the condenser 27. The resulting distilled water flows down to the collector 42 wherefrom it is fed, via the pipeline 127, to the pump 128 which feeds a part of the distilled water for liquefying the ice in the separator 7 below the cover plate 5, as described above, and the remaining part of the distilled water is fed, via the pipeline 69, to the three-circuit heat exchanger 28.

In the heat exchanger 28, the distilled water ascending along the spiral slit 50 is heated at about 18° C. to cool down the starting solution which descends within the adjacent spiral slit 48. The distilled water is removed from the heat exchanger 28 as finished product through the outlet 70 as indicated by the arrow 71 (in the desalination mode).

A part of the brine from the bottom wall 6 is fed, by means of the pump 95, for mixing with the starting solution, as described above, another part of the brine is fed, as mentioned above, to the outer ice-forming surface of the crystallizer 18, and a third part of the brine is removed from the desalination unit 1 as finished product, e.g. when operating in the mode of concentration of food liquids, via the pipeline 73 and the three-circuit heat exchanger 28 after having exchanged heat with the starting solution.

The refrigeration compressor 110 removes the refrigerant vapours from the inner space 108 of the crystallizer 18 through the pipeline 24, separator 25 and the pipeline 109, and the vapours are compressed and fed, in the major part, via the pipelines 111 and 61, in the form of compressed gaseous refrigerant to the plate-and-rib condenser 27, and a smaller part of the refrigerant is fed, via the pipeline 114, to the additional refrigeration compressor 115 to be compressed therein and fed therefrom further, via the pipeline 77, to the additional plate-and-rib condenser 29. The refrigerant is condensed in the annular slit-shaped space 54 at about 28° C. as a result of the heat exchange with the cooling water circulating through the adjacent annular slit-shaped space 55 which is fed to the additional condenser 29 as indicated by the arrow 81 and leaves the condenser as indicated by the arrow 83.

Liquid refrigerant is fed from the condenser 27, via the pipeline 63, through the throttle valve 112 and the pipeline 113, to be mixed with the liquid refrigerant leaving the additional condenser 29, via the pipeline 79, the throttle valve 116 and the pipeline 117, and the mixture is fed, via the pipeline 118, to the bottom part of the inner space 108 of the crystallizer 18.

Therefore, the present invention enables separation of aqueous solutions and production of distilled water and brine (or concentrate of food liquid when operating in the concentration mode) with a preset degree of extraction from the starting solution.

Thus, it will be seen that the structure of the invention includes a starting solution feed means 92, 93 and a brine feed means 94-96 both of which communicate with the heat-exchanger means 28 which receives brine from the brine-feed means and starting solution from the starting solution feed means to cool the starting solution with the brine in the heat-exchanger means. A discharge conduit means 67, 100, 101 communicates with the heat-exchanger means 28 to receive the cooled starting solution therefrom and this discharge conduit means also communicates with the brine-feed means so that a mixture of brine and starting solution is discharged by the discharge conduit means. The crystallizer 18 forms an ice-forming means which receives the mixture discharged by the discharge conduit means to form ice therefrom, the scraper 84 forming a means for removing the ice from the ice-forming means, and the plate 17 forming a wall onto which the removed ice falls. The auger 8, 9, 16 forms a means for raising the ice from the wall 17 up to the upper part of the installation from which the ice falls onto the upper part of the condenser means 27 with which the refrigerant circulating means 110, 111, 61 communicates for delivering to the condenser means 27 vaporous refrigerant which condenses into a liquid in the condenser means 27, thus giving up its heat to the ice while the latter descends through the condenser means 27, the chamber 42 forming a collecting means situated beneath the condenser means 27 for receiving the ice which melts therein in the form of distilled water. A distilled water feed means 127, 128, 129 communicates with the collecting chamber 42 to receive the distilled water therefrom and to deliver the distilled water through the pipeline 129 to the upper part of the installation to fall downwardly along the ice which is being raised by the raising means 8, 9 so as to wash the ice while flowing downwardly in countercurrent thereto, thus providing at the plate 17 onto which the ice falls a brine solution while the pure ice from which the distilled water is formed is delivered to the upper part of the condenser means 27. This wall 17 is perforated so that the brine flows therethrough to be collected on the lower part 6 of the housing means 1, and the brine-feed means communicates with this lower part of the housing means 1 to receive therefrom the brine which is fed by the brine-feed means. The distilled water feed means 127, 128, 129 also communicates through the pipeline 69 with the heat-exchanger means 28 to deliver part of the distilled water thereto so that this part of the distilled water flows through the heat-exchanger means 28 to be withdrawn therefrom while also contributing to the cooling of the starting solution.

The means 119, 120, 121, 122 forms a gas-feed means for feeding the gas to the ice-raising means so that the gas also flows through the ice raised by the ice-raising means.

In addition, it will be seen that the above ice-forming means 18 has an inner surface on which the discharge conduit means delivers the mixture of brine and starting solution. This ice-forming means also has an outer surface to which undiluted brine is delivered from the brine-feed means through the branching brine-feed means 102, 104, 105, 106, 107, with an additional scraping means 85 being provided for removing from the outer surface of the ice-forming means 18 the ice which is formed thereon from the brine alone, so that this latter ice also is raised by the raising means 8, 9 together with the ice which forms at the inner surface of the ice-forming means from the mixture of brine and starting solution.

The refrigerant circulating means 110, 111, communicates through the conduit means 109, 25, 24, with the interior space 108 of the ice-forming means to receive the refrigerant therefrom, this refrigerant being delivered in vapor form as pointed out above to the upper part of the condenser means 27 for giving up heat to the ice at the condenser means 27 so as to form the disilled water therefrom, the liquified refrigerant being received from the condenser means 27 by the pipeline 63 which together with the valve 112 and the conduit 118 form a return conduit means for returning the refrigerant to the space 108.

The above refrigerant circulating means forms a main refrigerant circulating means which communicates with an auxiliary refrigerant circulating means 114, 115, 77, this auxiliary refrigerant circulating means communicating with the additional condenser means 29 for delivering part of the refrigerant thereto, this refrigerant condensing in the condensing means 29 and discharging therefrom in liquid form to be received by the conduit means 79, 116, 117 which communicates with the return-flow conduit means 118 for the refrigerant. A cooling water circulating means 81, 83 communicates with the additional condenser means 29 for circulating therethrough cooling water which extracts heat from the refrigerant in the auxiliary condenser means 29.

The freeze desalination and concentration apparatus according to the invention has a number of advantages:

the separator being arranged concentrically inside the crystallizer, rather than above the crystallizer, the size of the desalination unit is about two times smaller. It is noted that with this arrangement the height of the separator 7 is not reduced, and is even increased which is favourable for deep desalination of the ice mass and improvement of quality of distilled water;

the arrangement of the additional condenser 29 together with the three-circuit heat exchanger 28 and the condenser 27 for refrigerant and for melting ice in the top part of the desalination unit 1 in the form of an integral heat-exchange system composed of modular elements comprising efficient countercurrent plate-and-rib heat exchangers results in a compact design and reduction of metal consumption for the construction of the desalination and concentration apparatus;

the utilization of the outer surface of the crystallizer 18 for the formation of ice, the provision of the ice-cutting device 85 for cutting ice from that surface, as well as the provision of the bottom plate 17 and the picking-up vane 16 of the auger 9 enabling the change of the direction of flow of the ice mass result in an about two-fold improvement of throughput capacity of the desalination and concentration apparatus, and the metal consumption per unit of productivity is reduced to about the same extent;

feeding of the brine and mixture of the solution and brine to the outer and inner ice-forming surfaces of the crystallizer 18 by spraying results in an improved heat transfer rate in the crystallizer from about 100 W/m².deg. to 1 kW/m².deg., thereby considerably improving the efficiency of operation of the crystallizer;

feeding the mixture of the starting solution and a part of the recycled brine to the inner surface of the crystallizer 18 enables prewashing of the ice mass with brine prior to the separation, the concentration of the brine being almost the same as that of the starting solution. Thus, the wet ice mass has a lowered concentration of salts at the inlet of the separator 7 (about two times lower) so that the load of the process of separation and washing of the ice mass from the brine is reduced. This is due to the fact that the ice formed on the outer ice-forming surface of the crystallizer 18 from the recycled brine only (having the salt content 2-4 times greater than that of the starting solution or its mixture with a part of the recycled brine), is washed, during the movement over the perforated bottom plate 17, under the action of the pick-up vane 16 of the auger 9, with the brine having lowered concentration which descends together with the ice to the bottom plate 17 from the inner ice-forming surface of the crystallizer 18. The degree of lowering of the concentration of brine in the ice mass during the prewashing thereof is rather high, and this circumstance play an important part as regards the opportunity of operating the desalination apparatus in the concentration mode. Thus, if a starting solution is orange juice (concentration mode) having a concentration of dry substances of about 13%, the prewashing of the ice mass with the starting juice (or with a mixture thereof with a small part of the concentrate) in the course of concentration to 42% permits the separation of the ice mass in the separator to be started from about 15-18% concentration, rather than from 42% concentration. This results in an improved quality of distilled water (or in lower losses of dry substances with the removed distilled water);

separate feeding of brine and mixture of the starting solution and recycled brine to the outer and inner ice-forming surfaces of the crystallizer 18 provides a number of advantages in the operation of the desalination and concentration apparatus (enables the control of flow rates and concentration values in feeding the liquids to those surfaces which is important for obtaining optimum conditions for controlling the points of eventual clogging of piping);

the connection of the gas pressure device 119 to the cover plate 5 of the desalination unit 1 and the countercurrent feeding of gas penetrating the ice mass ascending through the separator 7 makes the ice more permeable for the downward flow of the brine thus improving quality of distilled water. Therefore comprehensive measures are provided for in the freeze desalination and concentration apparatus which are directed at lowering salt content (or dry substances content) in the distilled water;

the provision of the additional refrigeration compressor 115 and additional condenser 29 in the system of the desalination and concentration apparatus results in 1.5 times reduction of power consumption.

The freeze desalination and concentration apparatus according to the invention is a universal, compact and small-sized apparatus, has low power consumption, is convenient in operation and enables an improvement of quality of distilled water.

What is claimed is:

1. In a freeze desalination and concentration apparatus, starting-solution feed means and brine feed means for respectively feeding starting solution and brine, heat-exchanger means communicating with both of said feed means for receiving the starting solution and brine therefrom and for placing them in heat-exchange relationship so that the starting solution is cooled by the brine at said heat-exchanger means, discharge conduit means communicating with said-exchanger means for receiving the cooled starting solution therefrom and for discharging the same, said brine feed means also communicating with said discharge conduit means for delivering brine thereto to be mixed with said cooled solution so that said discharge conduit means discharge a mixture of brine and starting solution, ice-forming means having a surface onto which said discharge conduit means discharges said mixture to form ice from said mixture at said surface of said ice-forming means, scraper means cooperating with said surface of said ice-forming means for scraping ice therefrom, perforated wall means situated beneath said ice-forming means to receive ice which falls therefrom, ice-raising means cooperating with said wall means for raising ice which collects thereon upwardly therefrom up to a predetermined elevation, condenser means situated adjacent said ice-raising means just beneath said elevation to which the ice is raised thereby for receiving ice from said ice-raising means and for melting the ice as the latter travels through said condenser means, collecting chamber means communicating with said condenser means for receiving therefrom the melted ice in the form of distilled water, distilled water circulating means communicating with said collecting chamber for receiving the distilled water therefrom and for circulating distilled water to said elevation to which the ice is raised by said ice-raising means for delivery at said elevation both to said condenser means to flow therethrough with the ice and to said ice raising means to flow downwardly along the latter in countercurrent to the raised ice for washing the latter and forming a brine which passes through said perforated wall means, said brine-feed means receiving the latter brine which passes through said perforated wall means for feeding the latter, and said distilled water circulating means also communicating with said heat-exchanger means for delivering distilled water thereto to travel therethrough and be extracted therefrom while being placed by said heat-exchanger means also in heat exchange relationship with the starting solution, said ice-forming means having an inner refrigerant-containing space, and refrigerant circulating means communicating with the latter space for receiving the refrigerant therefrom and delivering the refrigerant in vapor form to said condenser means to travel therethrough while being condensed therein into liquid refrigerant form, said condenser means extracting from said refrigerant heat which is utilized for melting the ice delivered to said condenser means by said ice-raising means, said refrigerant circulating means receiving the condensed refrigerant from said condenser means and returning the condensed refrigerant to said space.

2. The combination of claim 1 and wherein said surface of said ice-forming means onto which said mixture is delivered by said discharge conduit means is an inner surface of said ice-forming means, the latter having also an outer ice-forming surface, branch conduit means communicating with said brine feeding means for receiving therefrom brine which is not mixed with said starting solution and which is delivered by said branch conduit means to said outer surface of said ice-forming means to form ice thereon, outer scraper means cooperating with said outer surface of said ice-forming means for scraping ice therefrom, the latter scraped ice falling also onto said perforated wall means to be raised by said ice-raising means together with the ice delivered to said perforated wall means from said inner surface of said ice-forming means.

3. The combination of claim 2 and wherein said refrigerant circulating means is a main refrigerant circulating meas, and auxiliary refrigerant circulating means communicating with main refrigerant circulating means for receiving refrigerant therefrom and circulating the latter received refrigerant, said condenser means being a main condenser means which cooperates with said main refrigerant circulating means, and an additional condenser means communicating with said auxiliary refrigerant circulating means for receiving therefrom refrigerant in vapor form and condensing the same to liquid form, conduit means communicating with said additional condenser means for receiving the liquid refrigerant therefrom, the latter conduit means communicating with said main refrigerant circulating means for delivering thereto liquid refrigerant from said additional condenser means to be returned to said space of said ice-forming means, and cooling water supply and discharge means communicating with said additional condenser means for delivering and discharging cooling water to and from said additional condenser means, the latter placing the cooling water in heat-exchange relationship with said refrigerant received from said auxiliary refrigerant circulating means.

4. The combination of claim 3 and wherein said main condenser means is coaxially surrounded by said heat-exchanger means while said additional condenser means coaxially surrounds said heat-exchanger means.

5. The combination of claim 4 and wherein a housing means has an upper inner space in which said main condenser means is situated, said housing means having a lower inner space where said perforated wall means is located and said housing means having a bottom wall situated beneath said perforated wall means and on which the brine collects, said brine-feed means communicating with the interior of said housing means through said bottom wall thereof, and said ice-raising means being in the form of a rotary auger means extending upwardly from said perforated wall means coaxially through said main condenser means to an elevation slightly higher than the latter for delivering the raised ice to said main condenser means, said housing means having an upper wall through which said distilled water circulating means communicates with the interior of said housing means for delivering distilled water both to said main condenser means to travel therethrough with the ice and to said auger means to flow downwardly therealong.

6. The combination of claim 5 and wherein a gas-supply means communicates with the interior of said housing means through said upper wall thereof for delivering to the interior thereof gas which also flows downwardly along the ice which is raised by said auger means, said housing means having an outer wall portion formed with an opening through which gas escapes.

7. The combination of claim 5 and wherein said ice-forming means includes an inner wall having said inner surface which receives the mixture from said discharge conduit means and which cooperates with the scraping means which removes the ice from said inner surface of said inner wall, and said ice-forming means having an outer wall which receives the brine from said branch conduit means and with which said outer scraper means cooperates, said inner and outer walls of said ice-forming means defining between themselves the refrigerant-containing space and coaxially surrounding said auger means.

8. The combination of claim 7 and wherein both of said scraping means are connected with said rotary auger means to rotate therewith.

9. The combination of claim 7 and wherein said rotary auger means includes an upright shaft having a lower hollow portion forming part of said branch conduit means for receiving brine from said brine feed means, said brine branch conduit means including a pipe connected to said shaft of said auger means and communicating with said hollow space therein to receive the brine therefrom, and said pipe extending laterally from said shaft and upwardly along said ice-forming means outwardly of said outer surface thereof to deliver the brine to said outer surface to form ice at said outer surface of said ice-forming means.

* * * * *